(12) United States Patent
Paranjape et al.

(10) Patent No.: US 9,394,050 B2
(45) Date of Patent: Jul. 19, 2016

(54) CONTROLLED TRANSITORY OR SUSTAINED GLIDING FLIGHT WITH DIHEDRAL ANGLE AND TRAILING FLAPS

(71) Applicant: The Board of Trustees of the University of Illinois, Urbana, IL (US)

(72) Inventors: Aditya Avinash Paranjape, Urbana, IL (US); Soon-Jo Chung, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 128 days.

(21) Appl. No.: 14/068,235

(22) Filed: Oct. 31, 2013

(65) Prior Publication Data
US 2014/0319267 A1    Oct. 30, 2014

Related U.S. Application Data

(60) Provisional application No. 61/726,663, filed on Nov. 15, 2012.

(51) Int. Cl.
| | |
|---|---|
| *B64C 3/38* | (2006.01) |
| *B64C 31/02* | (2006.01) |
| *B64C 39/02* | (2006.01) |
| *B64C 3/42* | (2006.01) |
| *G05D 1/10* | (2006.01) |

(52) U.S. Cl.
CPC .............. *B64C 39/028* (2013.01); *B64C 3/42* (2013.01); *G05D 1/105* (2013.01); *Y02T 50/145* (2013.01)

(58) Field of Classification Search
CPC ............ B64C 3/38; B64C 3/385; B64C 3/42; B64C 3/56; B64C 31/02; B64C 39/028; A63H 27/08; A63H 27/007; A63H 27/00; Y02T 50/145

USPC .......... 244/16, 35, 46, 47, 49; 446/47, 61, 62, 446/66

See application file for complete search history.

(56) References Cited

U.S. PATENT DOCUMENTS

| | | | | |
|---|---|---|---|---|
| 2,074,099 | A | * | 3/1937 | Adams ............................ 244/47 |
| 2,075,787 | A | * | 4/1937 | Adams .......................... 244/219 |
| 2,757,886 | A | * | 8/1956 | Correa ............................ 244/64 |

(Continued)

OTHER PUBLICATIONS

Ameri, N., et al., "Modelling the Dynamic Response of a Morphing Wing with Active Winglets", AIA Atmospheric Flight Mechanics Conference and Exhibit, Aug. 20-Aug. 23, 2007, Chapter DOI: 10.2514/6.2007-6500 (19 pages).

(Continued)

*Primary Examiner* — Christopher Ellis
*Assistant Examiner* — Michael Wang
(74) *Attorney, Agent, or Firm* — Greer, Burns & Crain, Ltd.

(57) ABSTRACT

A micro aerial vehicle capable of controlled transitory or sustained gliding flight. The vehicle includes a fuselage. A pair of articulated wings are forward of a center of gravity of the vehicle, the wings being articulated and having trailing edge flaps, and having actuators for controlling the dihedral angles of the wings and the flaps for effective yaw control across the flight envelope. The dihedral angles can be varied symmetrically on both wings to control the aircraft speed independently of the angle of attack and flight-path angle, while an asymmetric dihedral setting can be used to control yaw and the actuators control the dihedral settings of each wing independently. The aircraft lacks a vertical tail or other vertical stabilizer.

11 Claims, 10 Drawing Sheets

(56) References Cited

U.S. PATENT DOCUMENTS

| | | | |
|---|---|---|---|
| 3,330,501 A * | 7/1967 | Barber | 244/47 |
| 3,744,741 A * | 7/1973 | Christian et al. | 244/16 |
| 5,008,825 A * | 4/1991 | Nadkarni et al. | 701/4 |
| 6,181,989 B1 * | 1/2001 | Gwozdecki | 701/4 |
| 6,322,021 B1 * | 11/2001 | Fisher et al. | 244/49 |
| 7,802,756 B2 * | 9/2010 | Kendall et al. | 244/45 R |
| 8,167,234 B1 * | 5/2012 | Moore | 244/17.25 |
| 8,190,305 B1 * | 5/2012 | Prince et al. | 701/3 |
| 8,376,279 B2 * | 2/2013 | Parks et al. | 244/123.11 |
| 2013/0284853 A1 * | 10/2013 | Farbolin | 244/16 |

OTHER PUBLICATIONS

Bourdin, P., et al., "Aircraft Control via Variable Cant-Angle Winglets", *Journal of Aircraft*, vol. 45, No. 2, Mar.-Apr. 2008, 99. 411-423.

Bourdin, P., et al., "Performing co-ordinated turns with articulated wing-tips as multi-axis control effectors", *The Aeronautical Journal*, vol. 114, No. 1151, Jan. 2010, pp. 35-47.

Gatto, A., et al., "Experimental Investigation into Articulated Winglet Effects on Flying Wing Surface Pressure Aerodynamics", *Journal of Aircraft*, vol. 47, No. 5, Sep.-Oct. 2010, pp. 1811-1815.

Paranjape, Aditya, A., et al., "Flight Mechanics of a Tail-less Articulated Wing Aircraft", AIAA GNC/AFM/MST/ASC/ASE 2010 Conference, Aug. 2-Aug. 5, 2010, Chapter DOI: 10.2514/6.2010-7633 (15 pages).

Paranjape, Aditya, A., et al., "Flight mechanics of a tailless articulated wing aricraft", *Bioinsp Biomim*, 6, (2) 026005, Apr. 12, 2011, Chapter DOI: 10.1088/1748-3128/6/2/026005 (20 pages).

Paranjape, Aditya, A., et al. "Experimental Demonstration of Perching by an Articulated Wing MAV", AIAA Guidance Navigation, and Control Conference, Aug. 8-Aug. 11, 2011, Chaper DOI: 10.2514/6.2011-6403 (20 pages).

* cited by examiner

CONTROLLED TRANSITORY OR SUSTAINED GLIDING FLIGHT WITH DIHEDRAL ANGLE AND TRAILING FLAPS

PRIORITY CLAIM AND REFERENCE TO RELATED APPLICATION

The application claims priority under 35 U.S.C. §119 from prior provisional application Ser. No. 61/726,663, which was filed Nov. 15, 2012, and which is incorporated by reference herein.

STATEMENT OF GOVERNMENT INTEREST

This invention was made with government support under contract number FA95500910089 awarded by the Air Force Office of Scientific Research. The government has certain rights in the invention.

FIELD

A field of the invention is flight and flying devices, and particularly articulated wing micro aerial vehicles. Example applications of the invention include bio-inspired flight devices.

BACKGROUND

The dihedral angle is the upward angle measured from horizontal of the wings or tailplane of an aircraft. If there are multiple sections of a wing having different angles from horizontal, then the wing can be referred to as polyhedral. Wing dihedral angle is known to play a role in lateral-directional stability. In standard aircraft including almost all large commercial and private aircraft, the wings are typically set at a fixed positive dihedral angle for stability. Aircraft such as the Lockheed Martin F-104 and AV-8B Harrier use a negative dihedral (anhedral) setting for improved agility. These basic aspects have been well-studied, and are covered in many textbooks related to flight. A flexible wing deforms in a way that the effective dihedral of the wing increases. This only adds to the stabilizing effect of the dihedral. The changes resulting from flexibility have also been documented.

Unlike fixed wing aircraft, flapping wing aircraft possess the ability to change the dihedral angle on demand. An asymmetric wing setting naturally produces a yawing moment, however. Others have investigated the use of articulated wings for roll and yaw control. The approach studied has focused on controllable winglets. An example of this type of control is found in various papers published by Friswell, Bourdin et al. See, e.g., Bourdin et al., "Aircraft Control via Variable Cant-Angle Winglets," Journal of Aircraft, Vol. 45, No. 2, March-April 2008. In this approach, the canted winglet in the inner wing is deflected upward to induce a turn. This reduces the net lift on the inner wing to induce the desired rolling moment, while the upward deflected winglet acts like a vertical tail and produces a proverse yawing moment in response to the rolling moment. This approach requires a segmented wing, and that only the winglet be deflected. With a monolithic wing, this approach can impair turning because the side force from the deflected wing may adversely dominate the side force required for turn (in a right turn, the deflected winglet produces a leftward force, whereas a rightward force is required to sustain/aid the turn).

Prior work by the present inventors and colleagues has advanced the state of micro aerial craft with articulated wings. Paranjape, A. A., Chung, S.-J., and Selig, M. S., "Flight Mechanics of a Tailless Articulated Wing Aircraft," Bioinspiration & Biomimetics, Vol. 6, No. 2, (12 Apr. 2011) discloses a micro aerial aircraft with articulated wings and a horizontal tail (no vertical "tail", and thus the reference to "tailless" aircraft in the title). This paper discloses that the wing dihedral can be varied symmetrically, along with the horizontal tail, to control the flight path angle independently of the fight speed. The micro aerial aircraft in the paper used dihedral angles that could be set asymmetrically for executing rapid zero sideslip turns. This work showed that the sign of the yaw moment derivative with respect to anti-symmetric dihedral depends strongly on the angle of attack and the angular rates. The primary demonstration of this work was to show that the yaw control effectiveness of the anti-symmetric dihedral depends primarily on the angle of attack, and also on the angular rates. When the angular rates are zero, the sign of the effectiveness depends on the sign $(x_a C_L/c + C_{m,ac})$, where $x_a/c$ is the non-dimensional distance between the center of gravity and the quarter-chord line. Furthermore, $C_{m,ac} < 0$ for wings with a positive camber, and therefore, at small angles of attack, the control effectiveness is negative and it is positive at higher angles of attack. For an intermediate range of angles of attack, the sign depends on the angular rates as well. This can cause immense problems for yaw control, particularly when the angle of attack varies across the three regions in the course of a maneuver. There was not a solution proposed for these problems in this paper. This unresolved problem had to do with yaw control effectiveness changing its sign inside the routinely flown flight envelope. The sign was seen to be sensitive to the angle of attack as well as the angular rates. Basically, every control law assumes that the sign of control effectiveness is known; if it changes sign inside the envelope and does so as a function of several variables, it is virtually impossible to design a robust, reliable controller. Thus, this paper did not provide a practical solution for a tailless micro aerial aircraft.

SUMMARY OF THE INVENTION

An embodiment of the invention is a micro aerial vehicle capable of controlled transitory or sustained gliding flight. The vehicle includes a fuselage. A pair of articulated wings are forward of the center of gravity of the vehicle, the wings being articulated and having trailing edge flaps, and having actuators for controlling the dihedral angles of the wings and the flaps for effective yaw control across the flight envelope. The dihedral angles can be varied symmetrically on both wings to control the aircraft speed independently of the angle of attack and flight-path angle, while an asymmetric dihedral setting can be used to control yaw and the actuators control the dihedral settings of each wing independently. The aircraft lacks a vertical tail or other vertical stabilizers.

DETAILED DESCRIPTION OF THE PREFERRED EMBODIMENTS

An embodiment of the invention is a vertical tailless micro aerial vehicle with a pair of articulated wings. The aircraft is controlled using wing articulation, together with trailing edge flaps, for effective yaw control across the flight envelope. The dihedral angles can be varied symmetrically on both wings to control the aircraft speed independently of the angle of attack and flight-path angle, while an asymmetric dihedral setting can be used to control yaw in the absence of a vertical tail. Actuators control the dihedral settings of each wing independently, and according to the mathematical formulation of closed loop control in the attachments, to achieve controlled sustained or transitory gliding flight. The wings are set ahead of the vehicle's center of gravity. Wing dihedral alone can be varied asymmetrically to perform rapid turns and regulate sideslip. The wings include trailing edge flaps. The trailing edge flaps are deflected downwards by a predetermined minimum amount.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figures 1A, 1B:
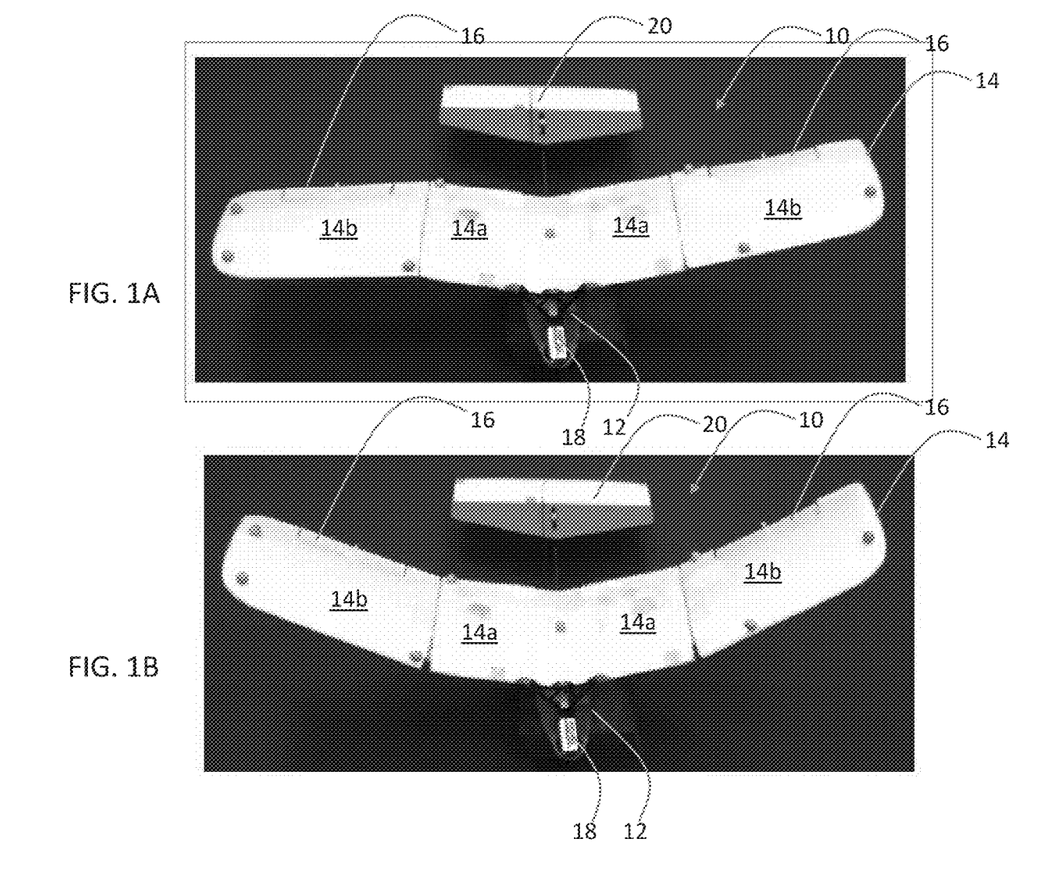
FIGS. 1A and 1B show an articulated wing micro aerial vehicle (aircraft) of the invention with respective symmetric and asymmetric dihedral angles.

FIGS. 1A and 1B show an articulated wing micro aerial vehicle 10 of the invention with respective symmetric and asymmetric dihedral angles. The vehicle 10 is consistent with an experimental device that has been tested for gliding flight. The vehicle 10 is a bird-sized flapping wing aircraft which can provide sustained or transient gliding flight. An airframe 12 supports articulated wings 14 that each have a fixed section 14a closer to the airframe 12 and an actuated (elevator) portion 14b that can be actuated to change its dihedral angle. Each actuated portion 14b includes a trailing flap 16. The actuated portions 14b of the two wings 14 and their flaps 16 are actuated independently from each other. The actuated portions 14b are capable, therefore, of both asymmetric (FIG. 1A) and symmetric dihedral angles (FIG. 1B) accompanied by independent deflection angles for the flaps 16. An on-board controller 18 is mounted to the airframe and conducts closed loop control to maintain flight characteristics by controlling the dihedral angles and the flap deflection angles with actuators. The flaps are set statically because a static deflection suffices for uniform yaw control effectiveness. Dynamic flap deflection can induce undesirable motion in the plane of symmetry of the aircraft and undesirable rolling motion. The controller 18 includes flight sensors to provide data needed for closed loop flight control. A horizontal tail 20 provides stability, and can be a simple fixed horizontal tail. In preferred embodiments, there is no requirement that the tail 20 be actuated.

Figure 1C:
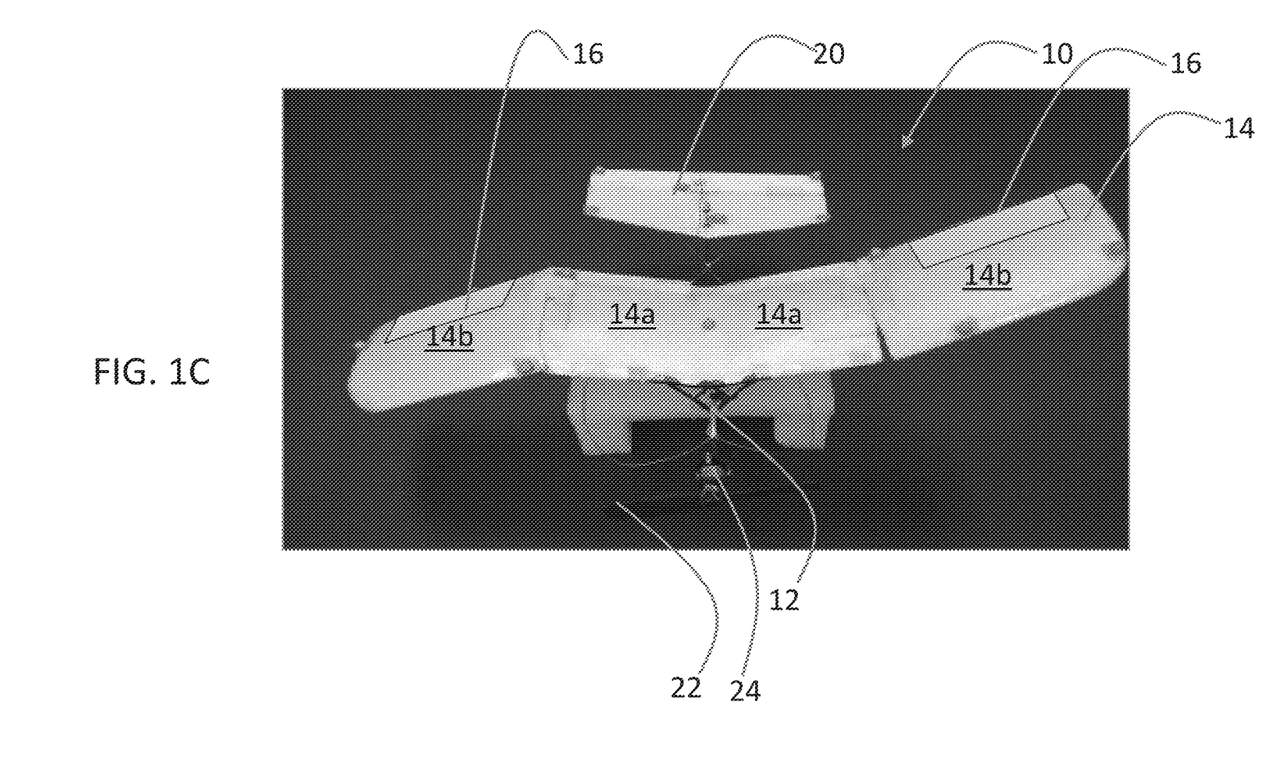
FIG. 1C shows another articulated wing micro aerial vehicle (aircraft) of the invention with a propulsion mechanism.

Other than the flapping wings 14 and trailing flaps 16, no additional yaw control mechanisms (such as a vertical tail, two degree of freedom horizontal tail, or split flaps) are required. The wings 14 shown can be considered rigid, but significantly flexible wings whose bending naturally creates a dihedral effect can be used with the invention while maintaining the control provided by the application of asymmetric and symmetric dihedral angles accompanied by independent deflection angles for the flaps 16. Methods and flight craft provide side force for yaw control in the same direction as that required for turning, which is advantageous compared to the winglet approaches that can create counterproductive side forces. FIG. 1C shows another exemplary micro aerial device 10a that includes a propulsion mechanism. The device 10a includes features of the devices of FIGS. 1A and 1B and these common features are labeled with like reference numerals. In addition, the device 10a includes a propeller 22 and motor 24. The device accomplishes sustained flight.

The following table defines some variable that are used in the following description.

| | |
|---|---|
| $C_L, C_R$ | coefficients of lift and drag |
| $C_{m,ac}$ | coefficient of pitching moment abot the aerodynamic center yawing moment |
| N | yawing moment |
| $\alpha, \beta$ | angle of attack, sideslip |
| $\psi, \Theta, \phi$ | Euler angles |
| $\gamma$ | flight path angle |
| p, q, r | body axis roll, pitch and yaw rates |
| $\delta_L, \delta_R$ | dihedral angle of left and right wing |
| $\delta_a, \delta_s$ | asymmetric diherdral angle $\delta_R = -\delta_L = \delta_a$ and symmetric dihedral angle |
| $\delta_e$ | Elevator or horizontal tail deflection |

Figure 2:
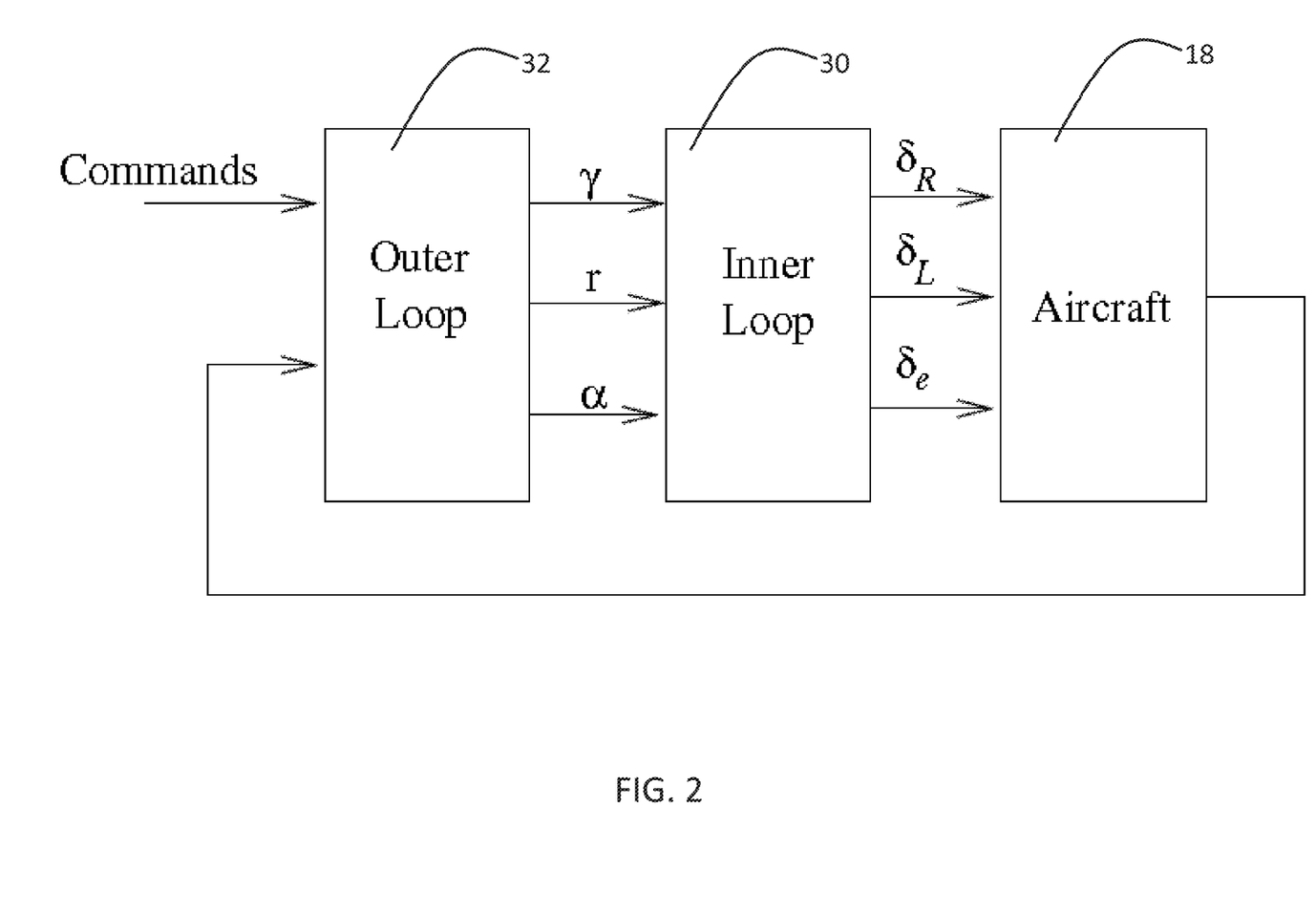
FIG. 2 is a block diagram of a closed loop control that is used to control actuated wing portions, elevator and associated flaps for an aircraft of the invention.

FIG. 2 illustrates a closed loop control that is used to control actuated wing portions 14b and associated flaps. The control law has a two-tier hierarchical structure based on time-scale separation, which occurs naturally between the fast rotational dynamics and the slow translational dynamics. An inner loop 30 commands the elevator and the asymmetric components of the wing dihedral. An outer loop 32 commands the angle of attack and turn rate to be tracked by the inner loop based on flight speed and turn rate. The input to the outer loop 32 are position commands and position errors from feedback, and the output includes the alpha and gamma variables, and yaw rate (r). These are passed to the input of the inner loop 30, that then determines and outputs the control surface deflections. The turn rate and the light path angle are computed based on position measurements provided by the aircraft controller 18. Generally, by statically deflecting the trailing edge flaps on the movable sections of the wing, the control loop can ensure that the sign of the control effectiveness remains positive across the entire flight envelope. Flap deflection can be decided a-priori and held constant throughout the flight. Once the sign of the control effectiveness is known and is guaranteed to remain unchanged across the flight envelope, any of a wide range of control designs can be used to achieve guarantees on performance and stability for practical flight conditions. With the control of FIG. 2, the vehicles 10 and 10a are capable of agile flight in the flapping as well as gliding phases.

Control in accordance with FIG. 2 was used to control an experimental aircraft as shown in FIGS. 1A-1B. Control was accomplished by a combination of feedforward and feedback controllers. The angle of attack was controlled by the elevator/tail 20. The tail 20 preferably includes a trailing edge flap to operate as an elevator, but the entire tail can also deflect. In addition, static tails are permitted. The flaps 16 were deflected to a constant angle of 10 deg. The flight path angle was controlled by changing the symmetric component of the wing dihedral (denoted by δ), while the aircraft heading was controlled by anti-symmetric deflection of the two wings (denoted by δasym).

$$\sin \gamma = \cos \alpha \cos \beta \sin \theta - \sin \beta \sin \phi \cos \theta - \sin \alpha \cos \beta \cos \phi \cos \theta \quad (1)$$

$$\sin \chi \cos \gamma = \cos \alpha \cos \beta \cos \theta \sin \psi + \sin \beta (\sin \phi \sin \theta \sin \psi + \cos \phi \cos \psi) + \sin \alpha \cos \beta (\cos \phi \sin \theta \sin \psi \sin \phi \cos \psi) \quad (2)$$

$$\omega = \dot{\chi} = \operatorname{sign}(\dot{\chi})\sqrt{p^2+q^2+r^2} \quad (3)$$

In the above equations, the flight path angle is γ, the wind axis heading angle is χ, and the turn rate is ω.

With a large horizontal tail, and the CG located approximately c/3 behind the wing aerodynamic center, the aircraft was sufficiently stable in pitch. Given the excellent open loop stability characteristics, the angle of attack was not controlled by feedback laws. Rather, the elevator deflection was set as a function of the commanded angle of attack. Specifically:

$$\delta_{e,c} = \frac{5}{3}(15 - \alpha_c) \quad (4)$$

$\alpha_c$ and $\delta_{e,c}$ are given in degrees instead of radians. Yaw control has been often neglected in past studies on perching aircraft, primarily because the aircraft considered in the literature had traditional roll and yaw control surfaces. Lateral directional control is an important concern for aircraft which lack a roll control surface and use a highly unconventional yaw control mechanism.

In an experimental controller, the wind axis heading angle χ was used as feedback for a PI yaw controller. While adding yaw rate feedback would provide for more robust control, the experiments demonstrated that the wind axis heading angle χ was sufficient for control. During test flight of experimental aircraft in as shown in FIGS. 1A and 1B, the dihedral angles of the two wings are controlled independently of each other. A left-right asymmetry in the wing dihedral angles and/or the force distribution on the wings leads to a net side force which, by the virtue of a non-zero distance between the aircraft center of gravity and the line of action of the force, translates into a yawing moment. Due to wing camber, the sign of the yawing moment for a given dihedral configuration depends on the angle of attack and the angular rates of the aircraft. Deflecting the trailing edge flaps on the articulated segments of the wing removes this non-uniformity.

Additional feedback control was also developed for the aerial vehicle of FIGS. 1A-1C. The control theory to be discussed includes use of the wing dihedral angles for control, use of the trailing edge flaps to mitigate control effectiveness problems, stability control, and closed loop control for perching. The relevant forces are discussed first.

Figure 3:
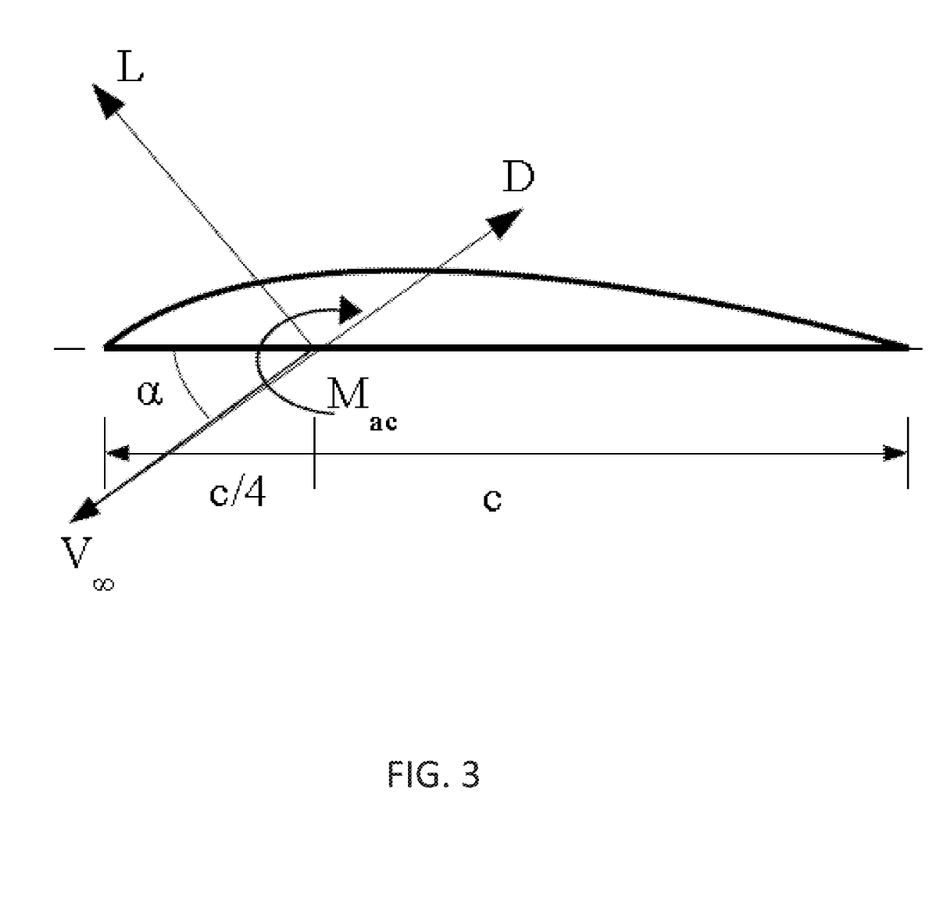
FIG. 3 illustrates the forces acting on a wing section.

FIG. 3 shows the forces acting on a wing section. The lift and drag both act in the plane of the airfoil; the lift is perpendicular to the local wind velocity, while drag acts along the local wind velocity. The quarter-chord pitching moment, $M_{ac}$, is produced as a result of the pressure distribution on the airfoil and is independent of the angle of attack α. Lift, drag and the quarter-chord pitching moment, all of them per unit wing span, are written as follows:

$$L = \frac{1}{2}\rho V_\infty^2 c C_L(\alpha), \quad (5)$$

$$D = \frac{1}{2}\rho V_\infty^2 c C_D(\alpha), \quad (6)$$

$$M_{ac} = \frac{1}{2}\rho V_\infty^2 c^2 C_{m,ac}, \quad (7)$$

where c denotes the chord length, and the non-dimensional numbers $C_L(\alpha)$, $C_D(\alpha)$, and $C_{m,ac}$ are the coefficients of lift, drag, and quarter chord pitching moment, respectively.

Figure 4:
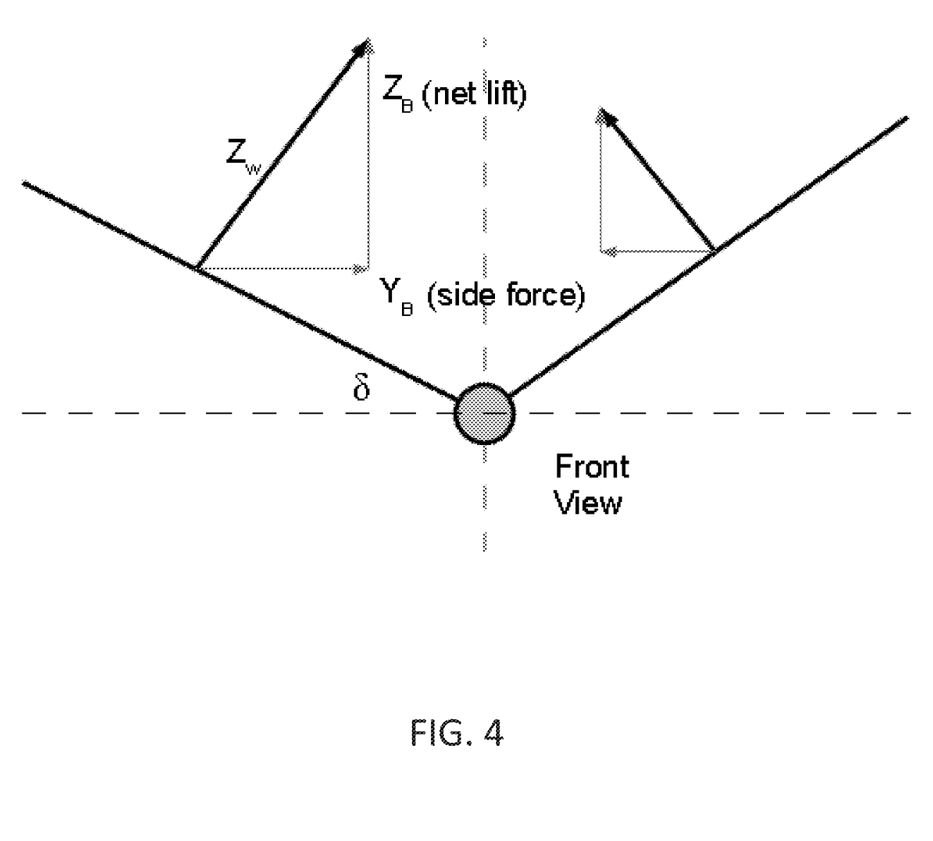
FIG. 4 illustrates the physics underlying the use of wing dihedral as a control.

FIG. 4 illustrates the physics underlying the use of wing dihedral as a control. The key point is that changing the wing dihedral re-orients the lift vector with respect to the aircraft z-axis. Increasing the wing dihedral reduces the force acting in the body z-direction, and generates a side force. The reduced z-force manifests in the form of reduction in the net lift acting on the aircraft, which is accompanied by an incommensurate reduction in the drag force. Thus, changing the wing dihedral angle alters the lift-to-drag (L/D) ratio of the aircraft and offers the option of controlling the flight path angle and the aircraft speed independently of each other.

Figure 5:
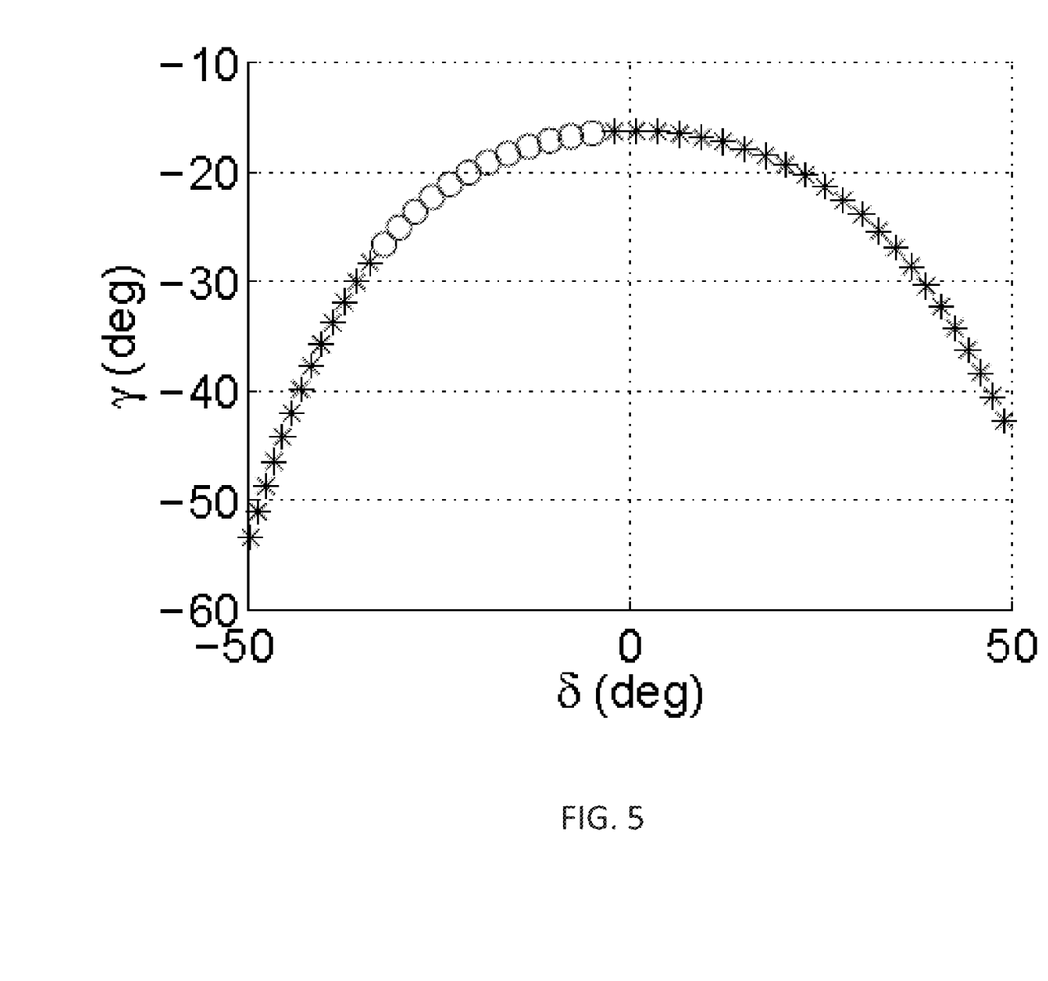
FIG. 5 illustrates the flight path angle as a function of the symmetric wing dihedral deflection.

FIG. 5 illustrates the flight path angle as a function of the symmetric wing dihedral deflection. The points shown in the figure are equilibria computed at the same flight speed of 3 m/s.

The side force can be used for providing the centripetal force for turning, and as a source of yawing moment. In particular, if the CG (center of gravity) is located behind the line of action of the side force, then a positive (rightward) side force produces a positive yawing moment and vice-versa. It follows that a positive rolling moment (wherein the lift on the left wing is higher than the right wing) is accompanied by a positive yawing moment if the wings have a positive dihedral deflection. In aircraft which lack a vertical tail, a positive rolling moment is accompanied by a negative yawing moment which leads to an increase in sideslip, with the consequence that the aircraft faces an increased drag and potential reduction in lateral-directional stability. This yawing moment which acts in a sense opposite to the rolling motion is called adverse yaw. Adverse yaw is one of the primary limiting factors for the lateral-directional performance of a vertical-tailless aircraft, and a positive wing dihedral naturally suppresses adverse yaw produced due to rolling The present inventors and colleagues have previously shown that that yaw control effectiveness of the anti-symmetric dihedral $\delta_{asym}$ depends not only on the angle of attack, but also on the angular rates. See, A. A. Paranjape, S.-J. Chung, and M. S. Selig, "Flight mechanics of a tailless articulated wing aircraft," Bioinspiration & Biomimetics, vol. 6, no. 2, 2011, paper number 026005. The non-dimensional control effectiveness is given by $$N_{\delta_{asym}} = (x_a C_L + C_{m,ac}) \quad (8)$$

where $C_L$ and $C_{m,ac}$ the coefficients of lift and quarter chord pitching moment, introduced in (1). The term $x_a$ denotes the non-dimensional (with respect to chord length) distance between the center of gravity and the quarter-chord line. Therefore, $$\operatorname{sign} N_{\delta_{asym}} = \operatorname{sign}(x_a C_L + C_{m,ac}) \quad (9)$$

For positively cambered wings, $C_{m,ac} < 0$ and therefore, at small angles of attack, where $C_L$ is small, the control effectiveness is negative. At higher angles of attack, the control effectiveness is positive.

Figure 6:
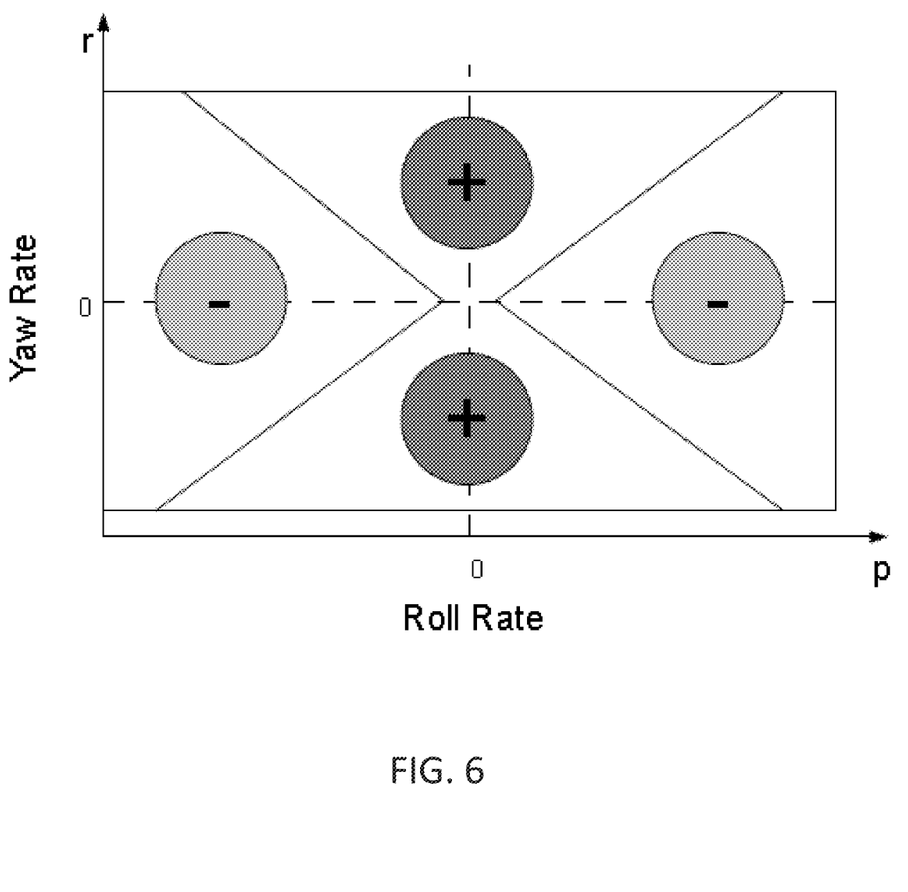
FIG. 6 illustrates the yaw control effectiveness measure sign$\{N_{\delta_{asym}}\}$ is a function of the roll rate p and the yaw rate r.

FIG. 6 shows that, for an intermediate range of angles of attack, the sign depends on the angular rates as well. In FIG. 6, the yaw control effectiveness measure sign $\{N_{\delta_{asym}}\}$ is a function of the roll rate p and the yaw rate r. This can cause problems for yaw control, particularly when the angle of attack varies across the three regions in the course of a maneuver.

In the invention, the problem of non-uniform sign of control effectiveness is solved with trailing edge flaps. Trailing flap deflection leads to a greater increase in $C_L$ as compared to the reduction in $C_{m,ac}$. Using the airfoil theory, it can be shown that the change in $C_L$ and $C_{m,ac}$ due to a flap deflection $\delta_f$ is given by $$\Delta C_L = (2(\pi - \theta_f + 2\sin\theta_f)\delta_f \quad (10)$$

$$\Delta C_{m,ac} = -\frac{\delta}{2}\sin\theta_f\cos(\theta_f - 1), \quad (11)$$

Where $\theta_f \in [0,\pi]$ depends on the location of the flap $(x_f c)$ from the leading edge:

$$\cos\theta_f = 1 - 2x_f \quad (12)$$

The term $\theta_f$ is defined purely for mathematical convenience in thin airfoil theory. For the example experimental aircraft consistent with FIGS. 1A and 1B, $x_f \approx 08.1$ and $x_a = 0.25$. Thus, $\theta_f = 2.2143$, $\Delta C_L = 3.45\,\delta_f$ and $\Delta C_{m,ac} = -0.14\,\delta_f$.

Figure 7:
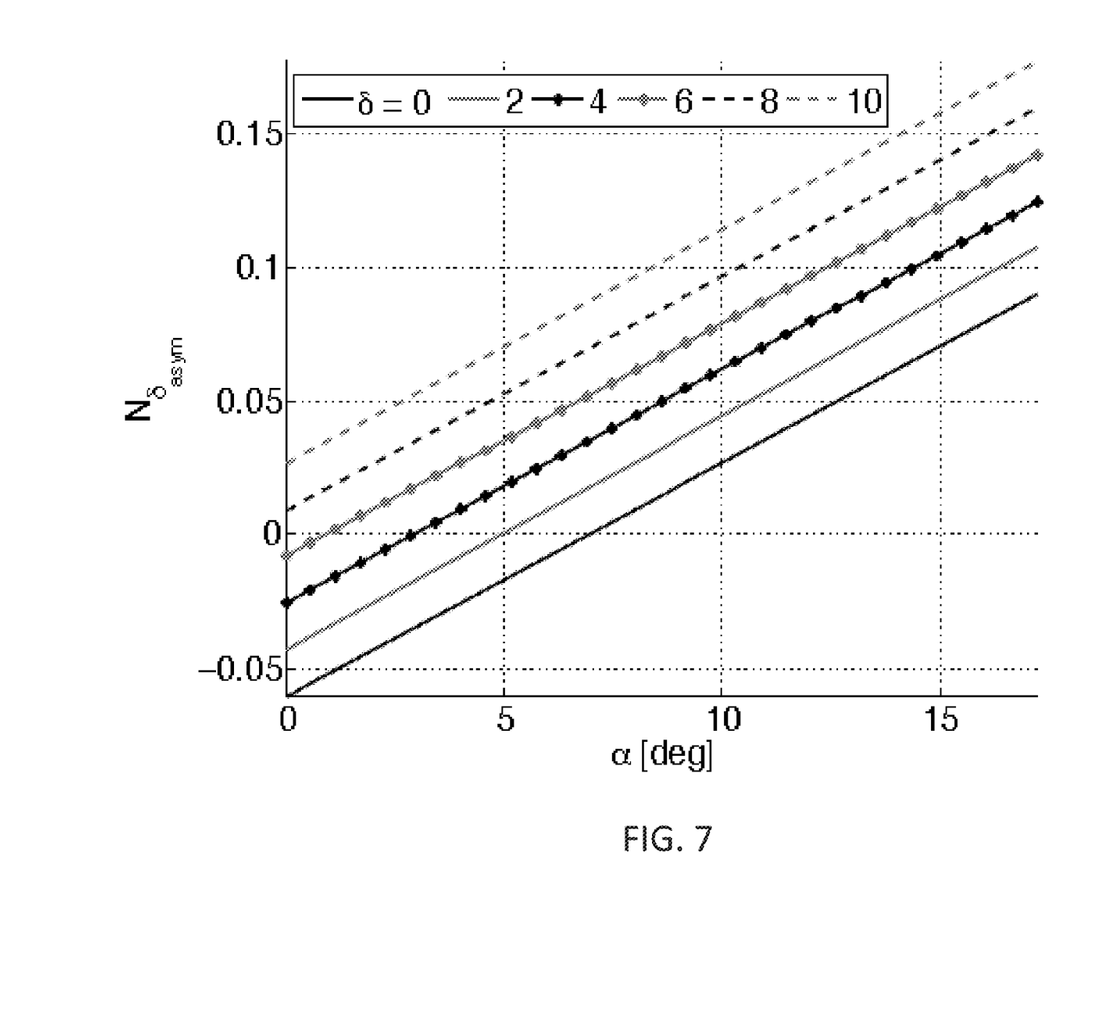
FIG. 7 illustrates the effect of trailing edge flap deflection over a range of values.

FIG. 7 illustrates the effect of using a trailing edge flap from the range of 0-10 degrees of deflection. The flap deflection can be set as a function of $\alpha$, and can be set to guarantee a certain positive control effectiveness. Consider an example needed effectiveness of at least 0.025 (corresponds to an $\alpha$ of 10 deg in FIG. 7). Then substituting the expression for $\Delta C_L$ and $\Delta C_{m,ac}$, it follows that $$\frac{C_L}{4} + C_{m,ac} + 0.72\delta_f = 0.025 \therefore 7.07 + 0.5 \propto -0.1311 + 0.72\delta_f = \quad (13)$$
$$0.025 \Rightarrow \delta_f = 0.12 - 0.69\alpha$$

Thus, flap deflection of nearly 7 deg is required at $\alpha=0$, and no flap deflection is required beyond $\alpha=10$ deg. A static flap deflection is preferred to avoid incurring any adverse effects from a dynamically varying flap deflection. In real terms, the flap deflection is preferably constant while the dynamics "settle down." When the flap position is changed, the dynamics are perturbed and they settle down after some time has elapsed. The duration that it takes for the dynamics to settle down is called the settling time of the system. Therefore, instead of a statically fixed flap setting, a "piece-wise constant" flap deflection can also be used, where the flap deflection is held fixed for at least the settling time of the dynamics (with some factor of safety). However, the minimum flap deflection angle is still decided by FIG. 7. A larger flap deflection can be used for low speed flight as needed.

The benefit of uniformly positive control effectiveness, however, comes with a trade-off. The aircraft flies in a high-lift (it can be checked that $C_L > 0.64$), high draft configuration across the flight envelope. This slows the aircraft. However, the flight path angle can still be controlled effectively using symmetric dihedral deflection.

The rigid flight dynamics, together with the aerodynamics and kinematics, are highly nonlinear. The equations of motion, ignoring terms that arise from the angular velocity of the wing motion (due to flapping), have essentially the following structure:

$$m(\dot{u}_B + S(\omega_B)u_B + (S(\dot{\omega}_B) + S^2(\omega_B))r_{cg}) = F_{net}$$

$$J\dot{\omega}_B + S(\omega_B)J\omega_B + m(S(r_{cg})u_B + S(\omega_B)S(r_{cg})u_B = M_{net} \quad (14)$$

where m is the total mass of the aircraft $m_\omega$ is the mass of each wing, J is the moment of inertia tensor for the aircraft $S(\bullet)$ denotes the vector product, and $F_{net}$ and $M_{net}$ represent the net external (aerodynamic+gravitational) force and moment on the aircraft. Furthermore, $\omega_B = [p,q,r]^T$ is the vector representation of the aircraft angular velocity of the aircraft, with components in the aircraft body axes. The net aerodynamic force depends on the wing orientation. The position of the aircraft center of gravity is denoted by $r_{cg}$, which is, in turn, approximated closely by $$r_{cg} = \frac{m_w b}{4m}[0, (\sin\delta_L + \sin\delta_R), (\cos\delta_L - \cos\delta_R)]^T \quad (15)$$

where $\alpha_L$ and $\alpha_R$ are the dihedral angles of the left and right wings, and b is the total wing span (so that each wing has length b/2). The force and moment vectors (and $F_{net}$ and $M_{net}$) depend strongly on the dihedral angles of the wings. This is demonstrated by the yawing moment component of $M_{net}$, which is given by $$N = Z_{w,L}(\alpha_L)\sin\delta_L - Z_{w,R}(\alpha_R)\sin\delta_R \quad (16)$$

where $\alpha_L$ and $\alpha_R$ are local angles of attack of the left and right wings (which actually vary as a function of y, the spanwise coordinate and $Z_{w,L}$ and $Z_{w,R}$ are the local z-forces on the two wings. The terms $\alpha_L$, and $\alpha_R$ themselves depend on $\delta_L$ and $\delta_R$, respectively. For example, $\alpha_R$ at a spanwise coordinate y is given by $$\alpha_R \approx \beta\sin\delta_R + \alpha\cos\delta_R + \frac{py + rx_a c\sin\delta_R}{u} + \frac{ry}{u}\propto\cos\delta_R + \frac{pry^2\cos\delta_R}{u^2} \quad (17)$$

where $x_a c$ is the distance between the center of gravity and the aerodynamic center of the wing. The sideslip is $\beta$, roll rate is p, and yaw rate is r. A similar expression can be written for $\alpha_L$.

In the simplest case, $Z_{w,L}$ and $Z_{w,R}$ are linear functions of $\alpha_L$ and $\alpha_R$, respectively. Even then, the flight dynamics of aircraft with articulated wings are nonlinear and non-affine-in control. However, recognition of and accounting for the following flight dynamics is used in the invention to simplify control design:

1) The pitch dynamics can be controlled entirely by the elevator, and almost always independently of the lateral directional dynamics. This is true for most aircraft, except those that lack a horizontal tail;

2) For the micro aerial vehicles of the invention, the pitch dynamics (q, $\propto$) are stable. The only source instability is the lateral-directionals dynamics involving the yaw rate r and sideslip $\beta$;

3) The roll dynamics are stable, and they are not controlled directly, since the wing dihedral primarily controls yaw with very little roll control effectiveness.

With these factors in mind, the control laws are determined as follows. Consider the problem of controlling the yaw ($\beta$ and r) dynamics. For the purpose of controlling the yaw dynamics, can be cast into the following control non-affine form $$\dot{\eta}(t)=f(t,\eta(t),\kappa(t),u(t)) \quad (18)$$

$$\dot{\kappa}(t)=\zeta(t,\eta(t),\kappa(t),u(t),p(t)) \quad (19)$$

where $\eta(t)=\beta(t),r(t))\in \mathbb{R}^2$ represents the yaw dynamics, while $u\in\mathbb{R}$ is the control input, viz., the asymmetric dihedral deflection ($\delta_{asym}$). The term p(t) represents other control inputs, namely the elevator deflection ($\delta_e$) and symmetric dihedral deflection ($\delta_{sym}$) which are used for longitudinal flight control. Finally $\kappa\in\mathbb{R}^6=[V_\infty,\alpha,p,q,\theta,\phi]$ represents the rolling and pitching motion, as well as translation in the plane of symmetry. The flight dynamic modes corresponding to these six states are to be stable. One of the control objectives is to stabilize $\eta(t)=\beta(t),r(t)$ in Equation (19), and ensure that it track a desired trajectory.

In embodiments of the invention, dynamic inversion laws are simplified to provide proportional-integral (PI) or proportional-integral derivative (PID) controllers. Specific example controls were based upon a class of dynamic inversion control laws defined in N. Hovakimyan, E. Lavretsky, and A. Sasane, "Dynamic inversion for nonaffine-in-control systems via time-scale separation. Part I," Journal of Dynamical and Control Systems, vol. 13, no. 4, pp. 451-465 (2007). Our modification/simplification yields exact gain tuning laws, which allows the control gains to be linked explicitly to the convergence properties of the closed loop system as well as the tracking error bound.

Consider a general system described by equation (19), where $\eta$ is no longer the yaw dynamics, but represents the state variables of interest for the purpose for control design. For now, we impose the additional condition $\eta\in D_\eta\subset\mathbb{R}$, where $D_\eta$ is compact. The case $\eta\in\mathbb{R}^2$ is addressed later in the section. Let $e(t)=\eta(t)-r(t)$ be the tracking error signal. Then the open loop error dynamics are given by $$\dot{e}(t)=f(e(t)+r(t),\kappa(t),u(t))-\dot{r}(t),e(0)=e_0$$

$$\dot{\kappa}(t)=\zeta(e(t)+r(t),\kappa(t),u(t)),\kappa(0)=\kappa_0 \quad (20)$$

where the unperturbed additional dynamics $\dot{\kappa}(t)=\zeta(0,\kappa(t),0)$ are assumed to be exponentially stabilized by to the control input p(t) (see (19)). We construct the dynamic inversion controller:

$$\epsilon\dot{u}(t)=-\text{sign}\left(\frac{\partial f}{\partial u}\right)\tilde{f}(t,\eta,\kappa,u), \quad (21)$$

with $\epsilon>0$ sufficiently, and $$\tilde{f}(t,\eta,\kappa,u)=f(t,e+r,\kappa,u)-\dot{r}(t)+a_me(t) \quad (22)$$

and $a_m>0$ gives the desired rate of convergence of the closed loop dynamics.

Lemma 1. (Theorem 1, [16]) Given the system (10), the controller in (11) ensures that 1) the tracking error $e(t)\sim\mathcal{O}(\epsilon)$, and
2) the control u(t) converges to the isolated root of (22), i.e. u(t) makes $f(\eta(t),\kappa(t),u(t))\to(a_me(t)+\dot{r}(t))$.

The proof of this theorem is based on Tikhonov's theorem (H. K. Khalil, Nonlinear Systems, 3rd ed. Pearson Education, Upper Saddle, N.J., 2000, Theorem 11.1), and is also reproduced in N. Hovakimyan, E. Lavretsky, and A. Sasane, "Dynamic inversion for nonaffine-in-control systems via time-scale separation. Part I," Journal of Dynamical and Control Systems, vol. 13, no. 4, pp. 451-465, 2007.

Remark 1. Although Lemma 1 guarantees that the tracking error $\sim\mathcal{O}(\epsilon)$, it does not provide any guarantees on robustness. In particular, using a high gain can be detrimental in the presence of time delays.

Theorem 1. The control law in Equation (31) is equivalent to a PI controller with proportional ($k_p$) and integral ($k_i$) gains tuned to satisfy $k_p=1/\epsilon$ and $k_i=a_mk_p$, where $a_m$ is the desired time constant for the closed loop dynamics.

Proof: Since $\dot{\eta}=f(t,\eta,\kappa,u)$ and $\dot{e}=\dot{\eta}-\dot{r}$, we write the controller as $$\epsilon\dot{u}(t)=-\text{sign}\left(\frac{\partial f}{\partial u}\right)\tilde{f}(t,\eta,\kappa,u), \quad (23)$$

$$=-\text{sign}\left(\frac{\partial f}{\partial u}\right)(\dot{e}(t)-a_me(t)),$$

Integrating both sides yields a PI controller of the form $$u(t)=u(0)-\text{sign}\left(\frac{\partial f}{\partial u}\right)\frac{1}{\epsilon}(e(t)-e(0)-a_m\int_0^t e(t)dt \quad (24)$$

We may choose $u(0)=-\text{sign}(\partial f/\partial u)\epsilon e(0)$. If $k_p$ and $k_i$ denote the proportional and integral gains of the PI controller, the they should be chosen to satisfy $$k_i=a_mk_p, \text{ and } k_p=1/\epsilon \quad (25)$$

so that $$u(t)=-\text{sign}\left(\frac{\partial f}{\partial u}\right)\left(k_pe(t)+k_I\int_0^t e(t)dt\right)$$

This completes the proof of Theorem 1. ∎

Consider a second order system, $\ddot{\eta}(t)=f(t,\eta,\dot{\eta},\kappa,u)$. We can write it in the form:

$$\dot{\eta}_1(t)=\eta_2(t)$$

$$\dot{\eta}_2(t)=f_2(\eta_1,\eta_2,\kappa,t)+g_2(t)u(t) \quad (26)$$

With $\eta=\eta_1$ as the output, the equation for $\eta_2$ is affine in u(t). The existence of $f_2(\bullet)$ and $g_2(\bullet)$ was shown in C. Cao and N. Hovakimyan, "L1 adaptive controller for a class of systems with unknown nonlinearities: Part 1," in Proceedings of the American Control Conference, Seattle, Wash., 2008, pp. 4093-4098. Note that $\text{sign}(g_2)=\text{sign}(\partial f/\partial\dot{\eta})$.

Define the desired value of $\eta_2(t)$ as $$\eta_2(t)=a(\eta_1(t)-r(t))+\dot{r}(t) \quad (27)$$

where r(t) is the reference trajectory for $\eta(t)=\eta_1(t)$ and a>0. Define the error state for $\eta_2(t)$ as $e_2(t)=\eta_2(t)-\eta_{2,d}(t)$ whose dynamics are given by $$\dot{e}_2(t)=f_2(\eta_1,\eta_2,\kappa,t)+g_2(t)u(t)-\dot{\eta}_{2,d}(t) \quad (28)$$

From Theorem 1, the controller $$u(t)=-\text{sign}(g_2)(k_pe_2(t)+k_I\int_0^t e_2(t)dt) \quad (29)$$

ensures that $\eta_2$ tracks $\eta_{2,d}$, where the gains $k_p$ and $k_I$ are chosen as per the guidelines in Theorem 1. The controller still needs further simplification to the PID form. Note that $e_2(t)=\eta_2(t)+ae_1(t)-\dot{r}(t)=\dot{e}_1(t)$. Substituting into (29), we get $$u(t)=-\text{sign}(g_2)(k_p\dot{e}_1(t)+(ak_p+k_1)e_1(t)+ak_I\int_0^t e_1(t)dt) \quad (30)$$

Which is a PID controller.

Theorem 2. The second-order system (26) can be stabilized using the PID controller (30), and it can be ensured that the tracking error between η(t) and the reference signal r(t) is bounded.

Proof: Theorem 1 guarantees that the control law (29) ensures that the tracking error $e_2(t)$ of the bounded (28) is bounded. Thus $\|\eta_2-\eta_{2,d}\|<O(\epsilon)$ for some $\epsilon>0$. Recalling the first equation $\dot\eta(t)=\eta_1(t)=\eta_2(t)$, since $\eta_2(t)=e_2(t)+\eta_{2,d}(t)$, we can write $$\dot\eta(t)=-a(\eta(t)-r(t)+\dot r(t)+e_2(t) \Rightarrow \dot e_1(t) \triangleq \dot\eta(t)-\dot r(t)=ae_1(t)+e_2(t) \quad (31)$$

Since the unperturbed $e_1$ dynamics (obtained by setting $e_2=0$) are potentially stable, it follows from the Comparison Lemma (Lemma 9.1 in H. K. Khalil, Nonlinear Systems, 3rd ed. Pearson Education, Upper Saddle, N.J., 2000) that $e_1(t)$ is bounded if $e_2$ is bounded. Moreover, the bound on $e_1 \sim \mathcal{O}(\epsilon)$. This completes the proof. ∎

Remark 2. The following observations summarize the results for the closed loop controller that has been developed.

1) PI and PID controllers can be employed for nonlinear systems of the form (19) provided the additional (κ) dynamics are stable.

2) The dynamic inversion procedure yields a systematic gain tuning procedure (25) and (30).

The objectives of controlled perching can be stated as follows:

1) Apply a control law for the symmetric dihedral deflection $(\delta_{sym}=\delta_L+\delta_R/2)$ which ensures that the flight path $z_x$ tracks the desired profile $z_d(x)$. The desired profile $z_d(x)$ is a straight line connecting the initial point to the desired final point $(x_f,z_f)$.

Figure 8:
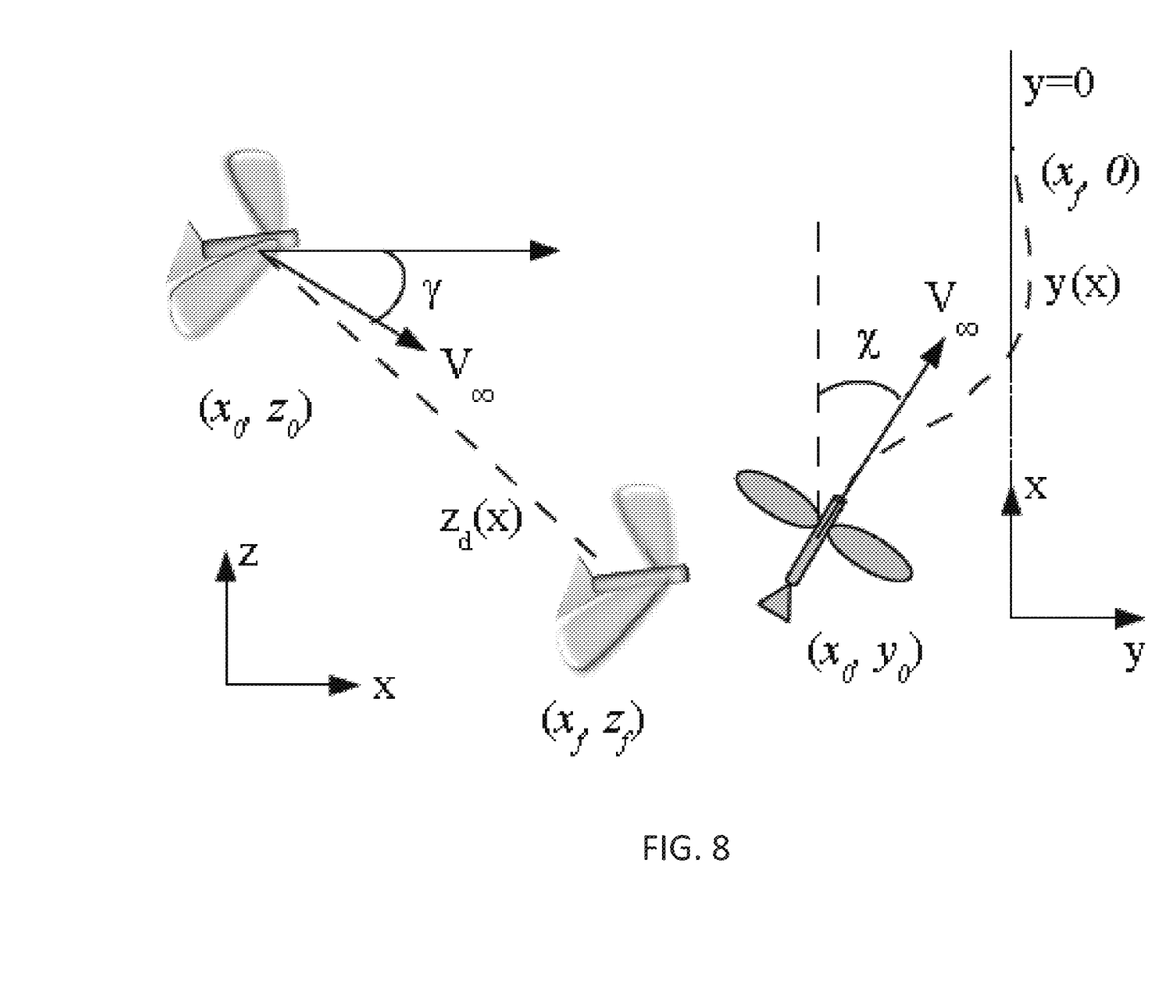
FIG. 8 schematically illustrates the guiding of an aircraft for a change in flight path.

This is illustrated in FIG. 8, which shows the guidance problem. The aircraft is guided in the x-z plane along $z_d(x)$, while the y coordinate is regulated separately. Note that the z axis points upwards. Consequently, the x; y; z axes shown do not define a conventional right-handed frame, but are used as a reference purely as a matter of convenience.

2) Apply a control law for the anti-symmetric dihedral deflection $(\delta_{sym}=\delta_L+\delta_R/2)$ which ensures that $y(x)\to 0$ as $x\to x_1$ the desired final point. This requires that the yaw (r) dynamics be stabilized.

Figure 9:
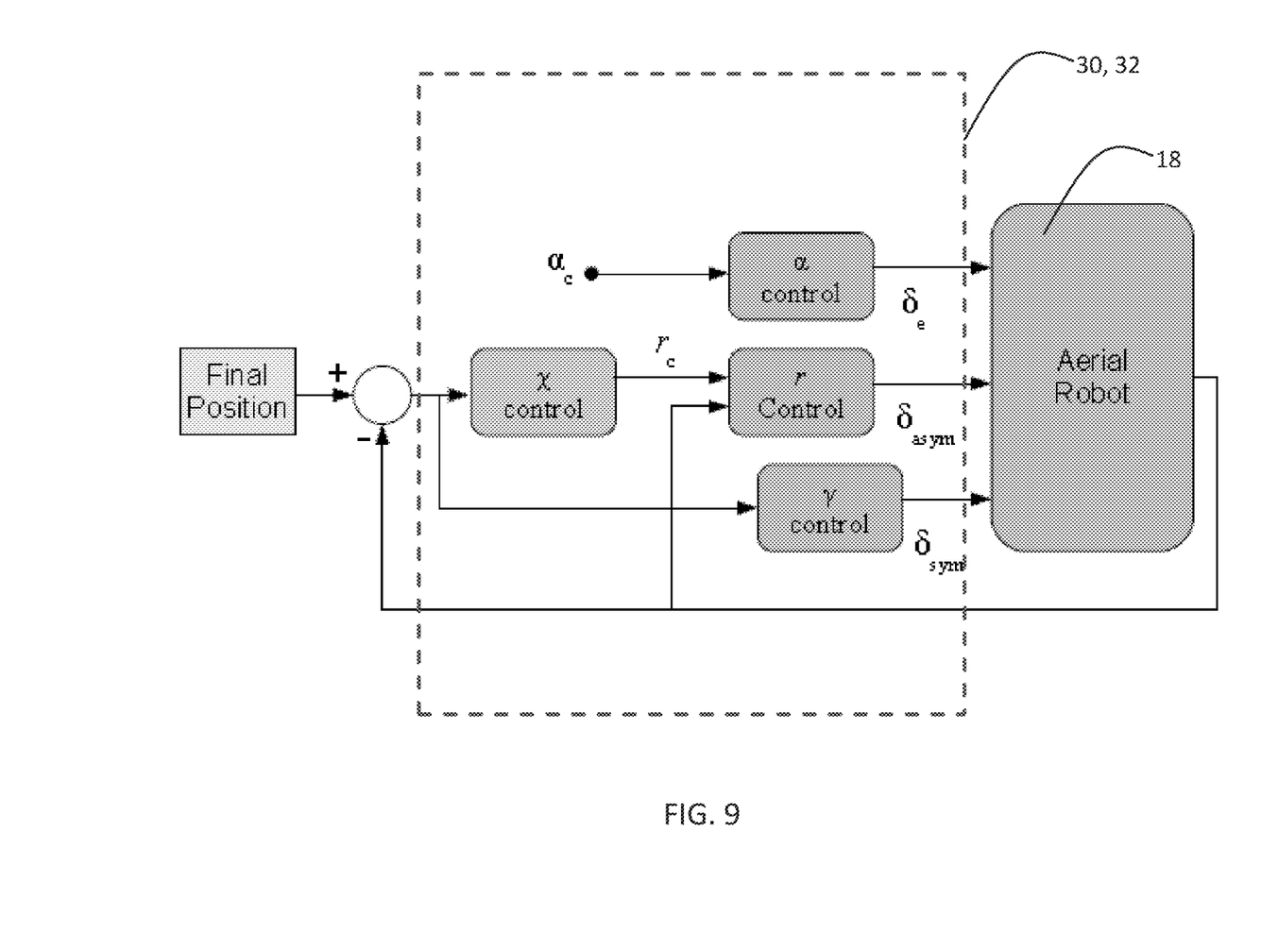
FIG. 9 is a block diagram for a preferred embodiment inner loop control for the closed loop control of FIG. 2.

FIG. 9 shows a preferred controller for the inner loop control 30 and outer loop control of FIG. 2 controller. The control and path guidance algorithms differ from past efforts due to the unconventional control inputs $\delta_{sym}$ and $\delta_{asym}$ and in view of the use of trailing flaps. Additionally, the angle of attack is controlled by the elevator. In an example experiment, the flaps are deflected to a constant angle of 10 deg. The stability proofs are presented by rewriting the dynamic equations in the spatial domain rather than as functions of time, thereby permitting the use of dynamic inversion. The flight path angle (γ) is given by A. A. Paranjape, S.-J. Chung, and M. S. Selig, "Flight mechanics of a tailless articulated wing aircraft," Bioinspiration & Biomimetics, vol. 6, no. 2, 2011, paper number 026005:

$$.\sin\gamma=\cos\alpha\cos\beta\sin\Theta-\sin\beta\sin\phi\cos\Theta-\sin\alpha\cos\beta\cos\phi\cos\Theta \quad (22)$$

while the wind axis heading angle χ is calculated as follows $$\sin\chi\cos\gamma=\cos\alpha\cos\beta\cos\phi\sin\psi+\sin\beta(\sin\phi\sin\Theta\sin\psi+\cos\Theta\cos\psi+\sin\alpha\cos\beta(\cos\phi\sin\Theta\sin\psi\sin\phi\cos\psi \quad (32)$$

Yaw control has been often neglected in the literature on perching. On the other hand, lateral-directional control is an important concern for aircraft which lack a roll control surface, such as an aileron, and use a highly unconventional yaw control mechanism.

With a large horizontal tail, and the CG located approximately c/3 behind the wing aerodynamic center, the aircraft was sufficiently stable in pitch. Given the excellent open loop stability characteristics, the angle of attack was not controlled by feedback laws. Rather, on the basis of open loop glide tests, the elevator deflection was set as a function of the commanded angle of attack:

$$\delta_{e,c}=\frac{5}{3}(15-\alpha_c),\ldots(\alpha \text{ in degrees}) \quad (34)$$

where $\delta_{e,c}$ and α have been specified in degrees instead of the more conventional units of radians. Equation (34) is identical to equation (4), but is repeated here for clarity of explanation and ease of reference.

Consider the equation $$\dot\gamma=\frac{\rho S C_L}{2m}V_\infty\cos\delta_{sym}-\frac{g}{V_\infty}\cos\gamma \quad (35)$$

where m is the aircraft mass, S us the wing area and $\delta_{sym}$ is the symmetric dihedral deflection $(\delta_{sym}=\delta_L+\delta_R)/2)$. Note that $$\frac{d\gamma}{dx}=\frac{\dot\gamma}{\dot x}=\frac{\dot\gamma}{V_\infty\cos\gamma} \quad (36)$$

If we further assume that $\cos\gamma\approx 1$, then the equations of translational motion simplify to the following form:

$$\frac{dz}{dx}=\tan(\gamma(x)) \quad (37)$$
$$\frac{d\gamma}{dx}=\frac{\rho S C_L}{sm}\cos^2\delta_{sym}(x)-\frac{g}{V_\infty^2}$$

where $\delta_{sym}$ is the control input.

The system in (37) is in the form (26) except that derivatives and functions are defined with respect to x, not t. Hence, by replacing t and dt in (30) with x and dx, the following controller is designed (see Theorem 2):

$$\delta_{sym}(x)=-\left(k_p\frac{de_z}{dx}+(ak_p+k_I)e_z(x)+ak_I\int_0^x e_z(x)dx\right) \quad (38)$$

where $e_z(x)=z(x)-z_d(x)$, and a is the desired rate of convergence of z(x) to the desired trajectory $z_d(x)$. The stability of the controller is guaranteed by Theorem 2. Note that the independent variable used in the controller is x, and not t. This is consistent with the recasting of the equations of motion in the spatial domain.

The motion in the x-y plane is given by $$\dot x=V_\infty\cos\gamma\cos\chi, \dot y=V_\infty\cos\gamma\sin\chi \quad (39)$$

We assume that the yaw rate r settles rapidly to the commanded yaw rate $r_c$, so that $r_c\approx r=\dot\chi/\cos\theta\cos\phi$. The inner loop yaw controller in FIG. 9 ensures that r converges rapidly to $r_c$. This is an expression of the time scale separation between the fast yaw (r) dynamics and the slower heading (y,χ) dynamics. Thus we get $$\frac{dy}{dx} = \tan\chi(x) \quad (40)$$

$$\frac{d\chi}{dx} = V_\infty \gamma \dot{\chi}(t) = \frac{V_\infty \cos\gamma}{\cos\Theta \cos\phi} r_c(x)$$

where $\phi$ is the bank angle of fuselage. Note that $\cos \gamma$, and $\cos \Theta$, and $\cos \phi$ are all positive since they lie in $[-\pi, \pi]$ (very generally), which implies that the control coefficient $V_\infty \cos \gamma/\cos \Theta \cos \phi$ is uniformly positive. The control problem is very similar to what is encountered for the flight path angle, show in (37), and we derive a similar controller as (38):

$$r_c(x) = -(k_p \tan(X(x)) + (ak_p + k_I) y(x) + ak_I \int_0^x y(x) dx) \quad (41)$$

The stability of this controller is guaranteed by Theorem 2. Further, as in the case of flight path control, the use of dynamic inversion was considerably facilitated by rewriting the dynamical equations in the spatial domain which rendered them in a strict feedback form. Next, we describe the design of the inner yaw control loop in FIG. 9.

Remark 3. The choice of y=0 as the desired path can be replaced by any suitable path $y_d(x)$, such as a straight line connecting the initial point and the desired final point, as for the flight path angle guidance law.

The objective of the inner yaw control loop in FIG. 9 is to command the anti-symmetric wing dihedral, $\delta_{asym}$, so that the rate r tracks the yaw rate commanded by the outer loop, $r_c$. Yaw control is achieved using a PI controller, motivated by Theorem 1, given by $$\delta_{asym} = k_p(r_c(t) - r(t)) + k_I \int_0^t r_c(t) - r(t)) dt \quad (42)$$

The proportional and integral gains were set to $k_p = k_I = 2$ during experiments.

Remark 4.

In practice, the heading and flight path angles are computed and commanded preferably every 0:05 s. This prevents undesirable oscillatory behavior which arises due to continuous changes in the wing dihedral, and the underlying coupling between the wing dihedral angle and the pitching dynamics of the aircraft.

The experimental air craft consistent with FIGS. 1A and 1B have the following characteristics.

TABLE 2

| Property | Metric Measurement | Units |
| --- | --- | --- |
| Mass (m) | 44.0 | g |
| Wing span (S) | 41.8 | cm |
| Wing Chord (c) | 9.5 | cm |
| Wing incidence angle (left and right) | 6.0 | deg |
| Wing dihedral | controlled-variable | |
| MAV length | 35.0 | Cm |
| Elevator area | 39.12 | cm$^2$ |

The articulated portion was hinged and included the outboard 60% of the wing. It has five control surfaces:

1) An elevator, which is a movable flap attached to the horizontal tail, and whose deflection is denoted by $\delta_e$.

2) The dihedral angles ($\delta_R$ and $\delta_L$) of the outboard segments of the right and left wing can be changed independently of each other. The actuators for changing the wing dihedral angle were attached on the lower surface of the center (non-rotating) wing section, along with the radio receiver.

3) The outboard segments were equipped with flaps which are capable of being actuated independently. In the experiments, both flaps were deflected by the same amount $\delta_f$. Flaps are used for ensuring uniform yaw control effectiveness. These flaps, when deflected in an anti-symmetric manner, can also act as the traditional ailerons.

Both wings in the experimental aircraft can rotate from a maximum 45 deg dihedral to minimum −15 deg for a total arc range of 60 deg. The actuators for wing dihedral, are controlled independently on both wings. Digital actuators with a torque rating of 0.29 kg-cm are used to maneuver the wings. The time required for the wings to rotate from the minimum −15 deg to maximum 45 deg is about 0.05 s, and the actuators have a time-delay of 200 ms.

While not bound by this theory and not needed to demonstrate patentability, the experiments demonstrate that the invention provides what is believed to be the first perching demonstration on a laterally unstable aerial robot. In experiments, the lateral-directional motion of the aircraft was controlled actively for the entire duration of the maneuver. This complements and advances the state of the art experiments reported in the literature which were concerned almost exclusively with the longitudinal motion of stable aircraft.

The experimental aircraft used variable, asymmetric wing dihedral effectively to control the flight path as well as the heading of the aerial robot. Trailing edge flaps ensure that the wing dihedral provided uniform yaw control effectiveness across the flight envelope. The closed loop guidance laws of the invention provide perching through control developed by rewriting the equations of motion in the spatial domain and applying dynamic inversion-motivated PID control. Experiments demonstrate the ability for the aircraft to conduct controlled guided flight and perch on hand, which is a significant advance in developing micro aerial vehicles capable of close operational interaction with humans.

The above example aircraft has been flight-tested. During flight, the dihedral angles of the two wings are controlled independently of each other. A left-right asymmetry in the wing dihedral angles and/or the force distribution on the wings leads to a net side force which, by the virtue of a non-zero distance between the aircraft center of gravity and the line of action of the force, translates into a yawing moment. Due to wing camber, the sign of the yawing moment for a given dihedral configuration depends on the angle of attack and the angular rates of the aircraft. Deflecting the trailing edge flaps on the articulated segments of the wing removes this non-uniformity.

The deflection of trailing edge flaps symmetrically in methods and aerial vehicle of the invention, achieves an increase in the sectional lift coefficient to the extent that the yaw control effectiveness is uniformly positive across the flight envelope. It is well-known that trailing edge flaps increase the sectional lift coefficient, and calculations from thin airfoil theory show that this increase in lift is much more than the increase in the magnitude quarter chord pitching moment coefficient. However this use of trailing edge flaps runs counter to intuition for improving the yaw control authority, and would have been generally viewed: flap deflection increases the wing camber which is, in principle, responsible for a non-zero quarter-chord pitching moment in the first place.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A micro aerial vehicle capable of controlled transitory or sustained gliding flight, comprising:
   a fuselage; and
   a pair of articulated wings forward of a center of gravity of the vehicle, the wings being articulated and having trailing edge flaps, and having actuators for controlling the dihedral angles of the wings and the flaps for effective yaw control across the flight envelope, wherein the dihedral angles can be varied symmetrically on both wings to control the aircraft speed independently of the angle of attack and flight-path angle, while an asymmetric dihedral setting can be used to control yaw and the actuators control the dihedral settings of each wing independently;
   wherein the aircraft lacks a vertical tail or other vertical stabilizer.

2. The vehicle of claim 1, having closed loop control means for controlling the actuators for sustained or transitory gliding flight.

3. The vehicle of claim 2, wherein the closed loop control means further controls the actuators for perching.

4. The vehicle of claim 3, further comprising an elevator and associated actuator, and wherein said closed loop control means further control the associated actuator for sustained or transitory gliding flight and for perching.

5. The vehicle of claim 1, further comprising:
   an elevator and associated actuator; and
   a closed loop controller, wherein the controller controls the actuators and associated actuator such that dihedral angles of the two wings are controlled independently of each other; a left-right asymmetry in the wing dihedral angles is used to produce yawing moment, wherein the sign of the yawing moment for a given dihedral configuration depends on the angle of attack and the angular rates of the aircraft and wherein the trailing edge flaps are set to guarantee uniform yaw control effectiveness across the flight envelope.

6. The vehicle of claim 1, further comprising:
   an elevator and associated actuator; and
   a controller, the controller that applies a two-tier hierarchical structure based on time-scale separation, with an inner loop that commands the elevator and the asymmetric components of the wing dihedral and an outer loop commands the angle of attack and turn rate to be tracked by the inner loop based on flight speed and turn rate, and the controller deflects the trailing edge flaps to ensure that the sign of the control effectiveness remains positive across the entire flight envelope.

7. The vehicle of claim 1, further comprising:
   an elevator and associated actuator; and
   a controller that controls flight path angle by changing a symmetric component of the wing dihedral, controls heading by anti-symmetric component of the wing dihedral, and controls angle of attack by the elevator deflection.

8. The vehicle of claim 7, wherein the controller controls the elevator deflection as a function of a commanded angle of attach according to $$\delta_{e,c} = \frac{5}{3}(15 - \alpha_c),$$

where $\alpha_c$ and $\delta_{e,c}$ are given in degrees and $\delta_{e,c}$ is the elevator deflection and $\alpha_c$ is the commanded angle of attack.

9. The vehicle of claim 7, wherein the controller uses a wind axis heading angle as feedback for a PI (proportional integral) yaw controller.

10. The vehicle of claim 1, wherein said pair of articulated wings are rigid.

11. The vehicle of claim 1, wherein said pair of articulated wings and the trailing edge flaps are actuated by the actuators independently from each other.

* * * * *